GEORGE R. DUVAL.
Wheels for Vehicles.
No. 124,729.              Patented March 19, 1872.
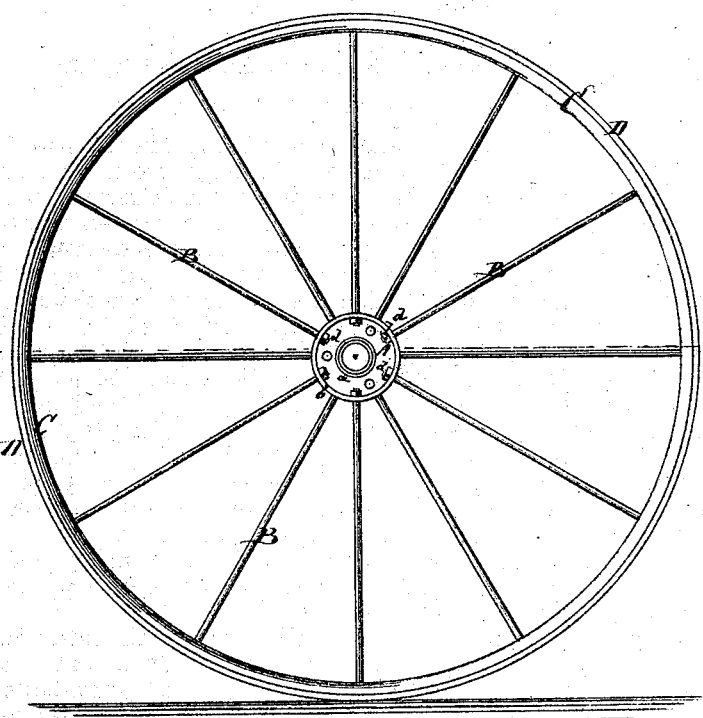
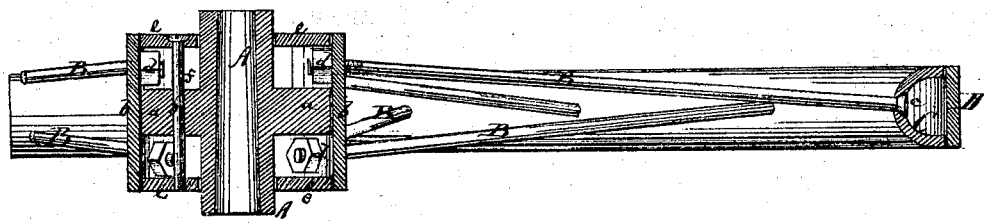

UNITED STATES PATENT OFFICE.

GEORGE R. DUVAL, OF SALEM, OREGON.

IMPROVEMENT IN WHEELS FOR VEHICLES.

Specification forming part of Letters Patent No. 124,729, dated March 19, 1872.

*To all whom it may concern:*

Be it known that I, GEORGE R. DUVAL, of Salem, in the county of Marion and State of Oregon, have invented a new and Improved Wheel for Vehicles; and I do hereby declare that the following is a full, clear, and exact description thereof, which will enable others skilled in the art to make and use the same, reference being had to the accompanying drawing forming part of this specification, in which—

Figure 1 represents a face view of my improved wheel. Fig. 2 is a detail transverse section, on an enlarged scale, of the same.

Similar letters of reference indicate corresponding parts.

The invention will first be fully described and then clearly pointed out in claims.

A in the drawing represents the hub of my wheel. It is made of cast-iron or other metal, and provided with a projecting flange, $a$. Around the said flange is shrunk a wrought-iron band, $b$, which projects beyond both sides of the flange, as shown in Fig. 2. The band is perforated with holes, which alternate from side to side of the flange $a$, they being thus arranged in a zigzag row to receive the inner ends of the spokes on alternate sides of the flange. B B are the spokes, and C is the rim of the wheel. The rim is made of wood or metal semi-cylindrical in cross-section, so that its convex side forms the inner circumference. Each spoke is made in form of a bolt with a head, C, at the outer ends—a screw-thread on the inner end. The spokes are fitted through apertures of the tire and rim, so that their heads are countersunk into the outside of the tire, and their inner ends are then passed through the band B, receiving nuts $d\ d$ on the inner side of the same. A plate, E, is then slipped over each end of the hub to fit within the band B, and rests against the nuts $d$. The plates E serve, therefore, to prevent the nuts from working loose, and also to protect them from mud and dust. Bolts F are employed to hold the plates E in place.

Having thus described my invention, I claim as new and desire to secure by Letters Patent—

1. A hub provided with central flange $a$ and band $b$ fitting thereover, in combination with the end plates $e\ e$ and screw-bolts $f$, all arranged and applied as and for the purpose described.

2. The end plate $e\ e$, held by screw-bolts $f$ against nuts $d$ and within band $b$, as and for the purpose described.

GEORGE R. DUVAL.

Witnessed:
   C. M. CARTWRIGHT,
   J. H. BRIDGES.